United States Patent [19]
Dobias et al.

[11] Patent Number: 5,289,918
[45] Date of Patent: Mar. 1, 1994

[54] CONTAINER FOR COMPACT DISCS

[76] Inventors: Scott Dobias, 115 Park Dr., Sterling, Ill. 61081; William Dobias, 929 S. Stone Ave., La Grange, Ill. 60525

[21] Appl. No.: 59,251

[22] Filed: May 10, 1993

[51] Int. Cl.⁵ .................. B65D 85/57; G11B 23/03
[52] U.S. Cl. ...................................... 206/312
[58] Field of Search .................. 206/309–313, 206/444

[56] References Cited

U.S. PATENT DOCUMENTS

| | | | |
|---|---|---|---|
| 3,426,960 | 2/1969 | Shore | 206/312 |
| 3,556,391 | 1/1971 | Kosterka | 206/312 |
| 4,709,812 | 12/1987 | Kosterka | 206/310 |
| 5,088,599 | 2/1992 | Mahler | 206/313 |
| 5,101,973 | 4/1992 | Martinez | 206/312 |
| 5,188,229 | 2/1993 | Bernstein | 206/312 |

FOREIGN PATENT DOCUMENTS

335826 10/1989 European Pat. Off. ............ 206/309
125238 6/1949 Sweden ............................. 206/312

*Primary Examiner*—William I. Price

[57] ABSTRACT

The invention comprises a user storage and display container for an individual compact disc (CD-audio, CD-ROM, CD-Interactive and others) which is constructed from a single prescored, precut and preprinted unitary blank or sheet. The container has a Disc Holder Panel that enables automated insertion of a compact disc directly down into the Disc Holder Panel which holds the disc at four points on its outer periphery without touching any part of the playable surface of the disc. The container allows display of the full face of the disc and allows easy removal of the disc from the container without the need for sliding the disc over any surface of the container, thereby eliminating any danger of scratching the disc. The container includes one or more Cover Panels to enclose and protect the disc.

16 Claims, 6 Drawing Sheets

CONTAINER FOR COMPACT DISCS

TECHNICAL FIELD

The present invention relates generally to storage containers for compact discs, and, more particularly, the present invention relates to a storage container for a compact disc which holds the disc securely for storage without touching the playing surface of the disc and allows full display of the entire face of the disc when the container is open.

BACKGROUND OF THE INVENTION

Choices of containers for a compact disc up until now have been limited to containers constructed entirely of plastic, containers constructed partially of plastic, expensive "set-up" boxes which do not fold up flat before they are used and which require a great deal of hand operations for fabrication from paperboard and paper liners, or a variety of paperboard sleeves and folders which hide all or a significant part of the disc from view until the disc is removed from the container and which can potentially scratch the disc.

The container of choice for compact discs (CD's or CD-ROM's) for recorded music or computer data at this time is the plastic "jewel-box". Because the design of the jewel-box requires the panel holding the compact disc to grip the disc by outward pressure on the periphery of the center hole of the disc, and also requires clear, rigid top and bottom panels to allow visibility of printed inserts, the material used must be injection molded plastic of the polystyrene type.

The environmental concerns of some recording artists, record labels and CD-ROM publishers have created a desire and need for a compact disc container that is not constructed of plastics, and especially polystyrene, which have serious environmental impact in their manufacture and which, at this time are not practically recyclable when they break or are discarded. These problems are solved by the invention disclosed herein which can be constructed from recycled and recyclable paperboard.

Current alternatives to the plastic jewel-box include the AGI DigiPak, U.S. Pat. No. 4,709,812; December/1987; Kosterka, which uses the same method of gripping the disc as the jewel-box and therefore requires a plastic CD holder similar to the one used in the jewel-box. Further, this alternative adheres the plastic disc holder to a blank of paperboard, creating a mixed material container that is virtually not recyclable. The invention disclosed herein avoids the use of plastic in its construction and is recyclable.

Other alternatives to the plastic jewel-box include paperboard or card stock folders like Leverick; U.S. Pat. No. 5,085,318; February/1992: Kaplan et al; U.S. Pat. No. 4,640,413; February/1987: and, Foreign patent number 2,278,594; February/1976; France and others where the disc, which frequently is decorated on its non-playing surface with designs, graphics or important information, is completely hidden or substantially hidden from view in a pocket. Further, these containers with pockets require insertion of the disc at the time of manufacture by expensive hand methods as opposed to automated insertion. Removal of the disc from a container with a pocket makes possible the scratching of the playing surface of the disc which is a more serious problem in regard to computer CD-ROM discs. All of these problems are eliminated in the invention disclosed herein, which allows display of the full surface of the disc, while holding it securely in a way that allows removal straight up and out of the container without the threat of scratching and enables automated loading directly down into the CD Holder Panel.

SUMMARY OF THE INVENTION

The present invention is a folded container constructed from a single, unitary sheet, which overcomes the shortcomings and limitations of the prior art compact disc packaging by providing a container having a Disc Holder Panel that has two sloped surfaces, each of which sloped surfaces has an elliptical diecut cutout. These elliptical diecut cutouts are shaped such that the larger of the two arcs of each ellipse is of sufficient height and size to allow a disc to drop through easily at the top of the arc, which is at the top of the sloped panel, while the descending portions of the same arc decrease in size enough to pinch in on the outer periphery of the disc at a point about one-half of the distance down the sloped surface. The smaller of the two arcs of each ellipse is sufficient to support a disc at the edges without touching any other surface of the disc. It is the object of this invention to enable discs to be inserted with automation directly down into the holder which will then hold the disc securely without the need for injection molded plastic parts. It is further the object of the invention to display the full face of the disc to view and to allow easy removal of the disc from the container without sliding the disc out of a pocket which exposes the disc to potential scratching on its playable surface.

A Cover Panel is folded over the Disc Holder Panel to provide a disc container that is the same physical dimension as a jewel-box and can therefore be stored in devices manufactured for storing jewel-boxes and can be shrink-wrapped for merchandising in retail fixtures manufactured for jewel-boxes.

Although developed for compact discs, the present invention can also be used to hold, display and store other round and flat products including, but not limited to laser videodiscs, mini-optical discs, wristwatches, coins and mediallions.

DETAILED DESCRIPTION OF THE INVENTION

Figure 1:
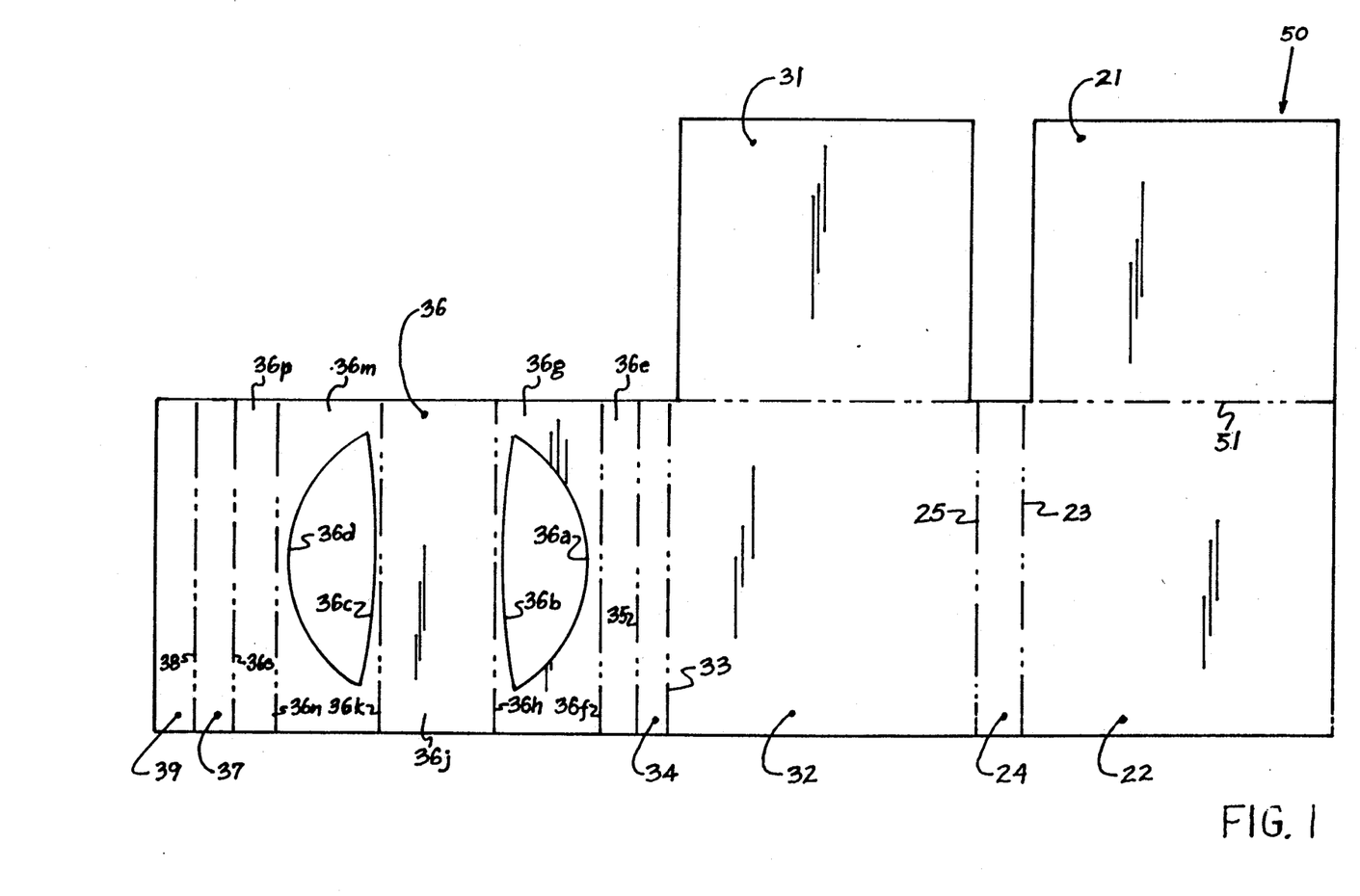
FIG. 1 is an unassembled plan view showing an unfolded blank from which one embodiment of the compact disc container may be constructed.

Referring to FIG. 1, Blank 50 in its unconstructed stage comprises a rectangular sheet having white printable surfaces, which is divided into five major Sections: 21, 22, 31, 32 and 36. Sections 21 and 22 and Sections 31 and 32 are bounded by Fold Line 51. Sections 22 and 32 are separated by a thin Section 24 which is bounded by Fold Lines 23 and 25. Sections 32 and 36 are separated by a thin Section 34 which is bounded by Fold Lines 33 and 35. Section 36 has two elliptical diecut cutouts which are formed by Arcs 36a, 36b, 36c, and 36d. The elliptical diecut cutouts are within Surface 36g which is bounded by Fold Lines 36f and 36h, and Surface 36m, which is bounded by fold lines 36k and 36n. The shapes and sizes of the Arcs 36a, 36b, 36c and 36d are specifically selected for reasons to be explained below.

Figure 2:
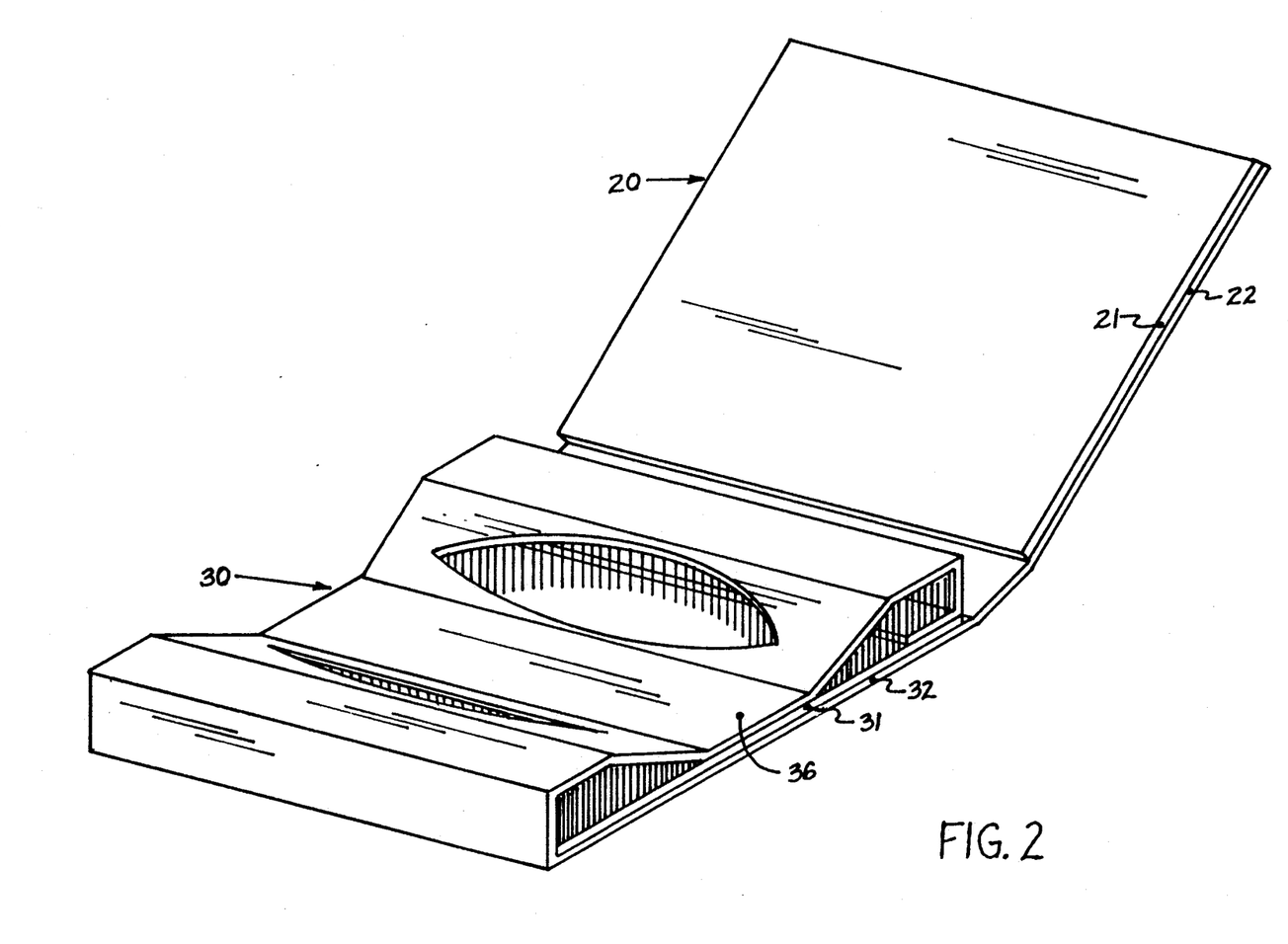
FIG. 2 is a perspective view of the embodiment of the invention constructed from the unfolded blank shown in FIG. 1 which includes a Disc Holder Panel and a Cover Panel.
Figure 3:
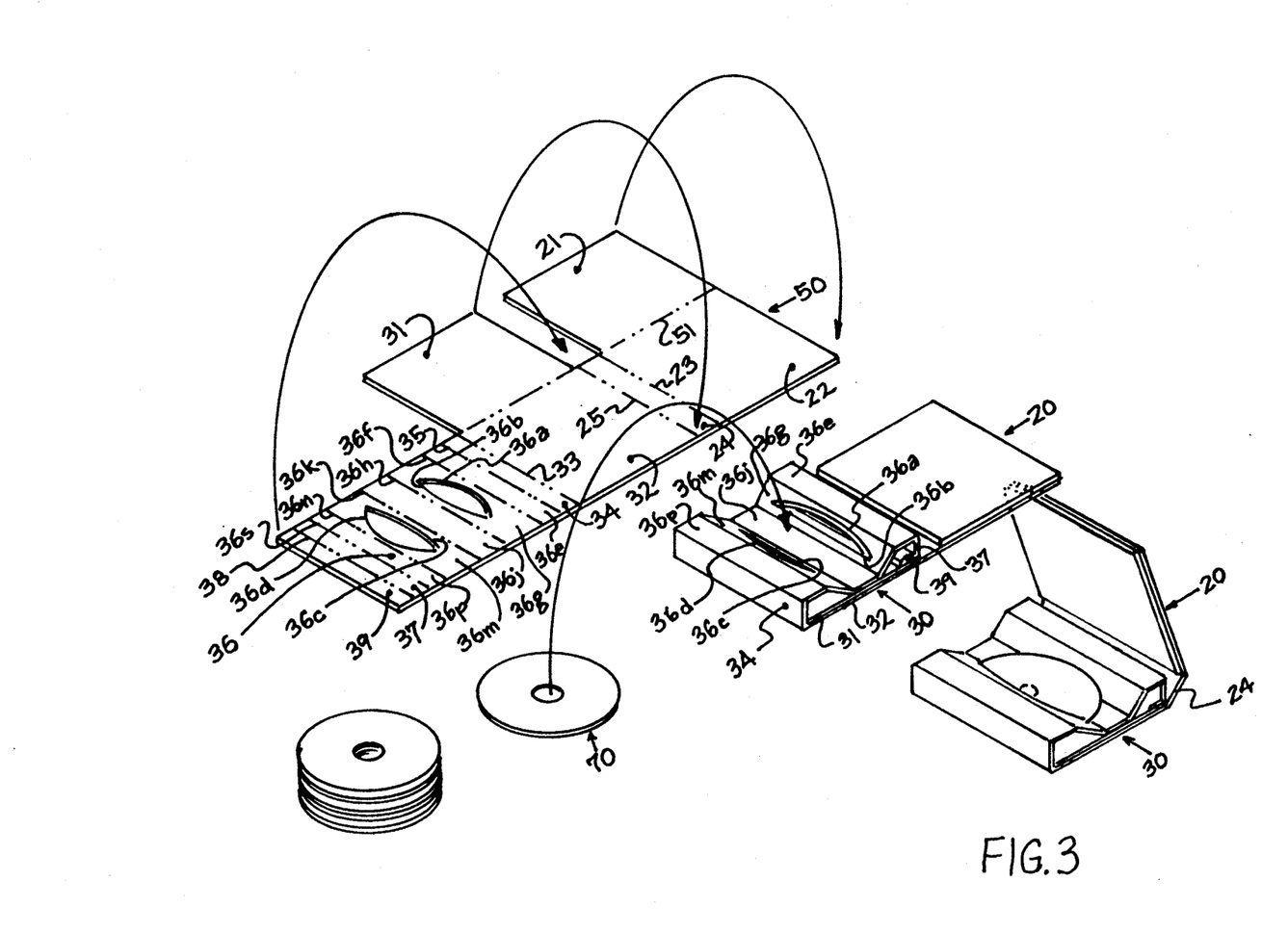
FIG. 3 illustrates a method of making a container and loading a Compact Disc into the invention.

During construction of the Container into the form shown in FIG. 2, the steps delineated in FIG. 3 are followed. Section 21 is folded over on Fold Line 51 on top of Section 22, and then glued down to form resultant Cover Panel 20. Section 31 is folded over on Fold Line 51 on top of Section 32, and then glued down to form the outside portion of Disc Holder Panel 30.

Further in construction as shown in FIG. 3, thin Section 34 is folded up at Fold Line 33 and Section 36 is folded over at Fold Line 35, enabling Surface 36j to be placed on top of Section 31 and then glued down.

Surface 36e, that is bounded by Fold Lines 35 and 36f, must be wide enough to provide and adequately sloped surface 36g when Surface 36j is glued down in the center of Section 31. Similarly, Surface 36p, that is bounded by Fold Lines 36n and 36s, must be wide enough to provide an adequately sloped Surface 36m when Surface 36j is glued down in the center of Section 31.

Thin Section 37 is folded down at Fold Line 36a and thin Section 39 is folded over at Fold Line 38, enabling Section 39 to be placed on top of Section 31 and glued down.

Section 34 must be of a width slightly greater than the width of Section 37 plus the thicknesses of Sections 31 and 32 in order to provide a clean appearance and structural integrity by matching the slope of Surface 36m to the slope of Surface 36g.

Folds 36h and 36k allow Surface 36j, which is the center of Section 36, to be glued down on top of Section 31 when the construction is performed. Together, Sections 31, 32 and 36 form Disc Holder Panel 30.

Figure 4:
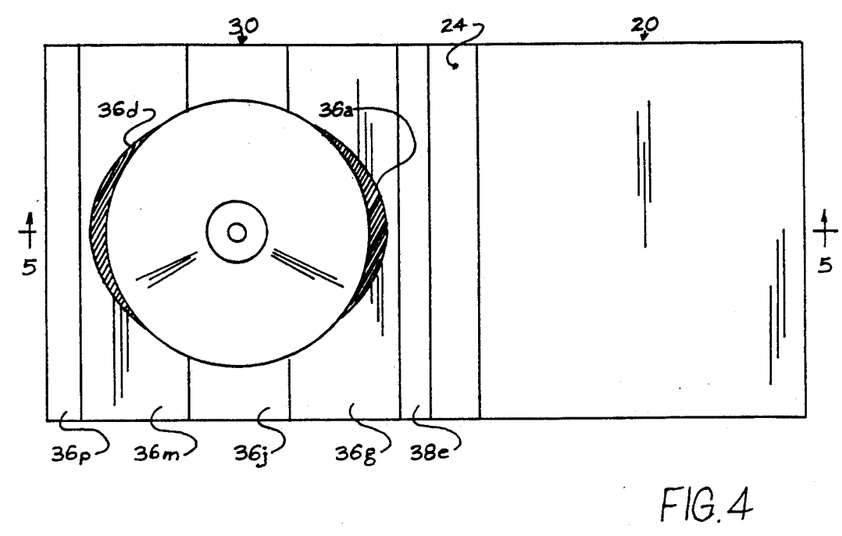
FIG. 4 is a general view taken from above showing the invention holding a Compact Disc.
Figure 5:
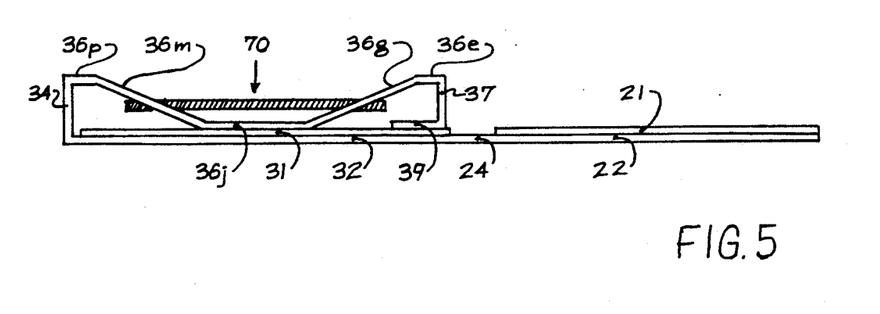
FIG. 5 is a detailed cross sectional view of the container shown along Line 5—5 in FIG. 4.

In the constructed Container, Compact Disc 70 is placed between Arcs 36a and 36d, whose size and shape are sufficient to allow the Compact Disc to pass easily between them at the top of Surfaces 36g and 36m. Arcs 36a and 36d decrease in size as they descend toward the bottoms of Surfaces 36g and 36m to pinch in on the outer periphery of Disc 70 at the intersection of Arcs 36a and 36b and Arcs 36c and 36d.

Section 24 is folded up at Fold Line 25 and Cover Panel 20 is folded over at Fold Line 23 to complete the construction of the Container.

Figure 6:
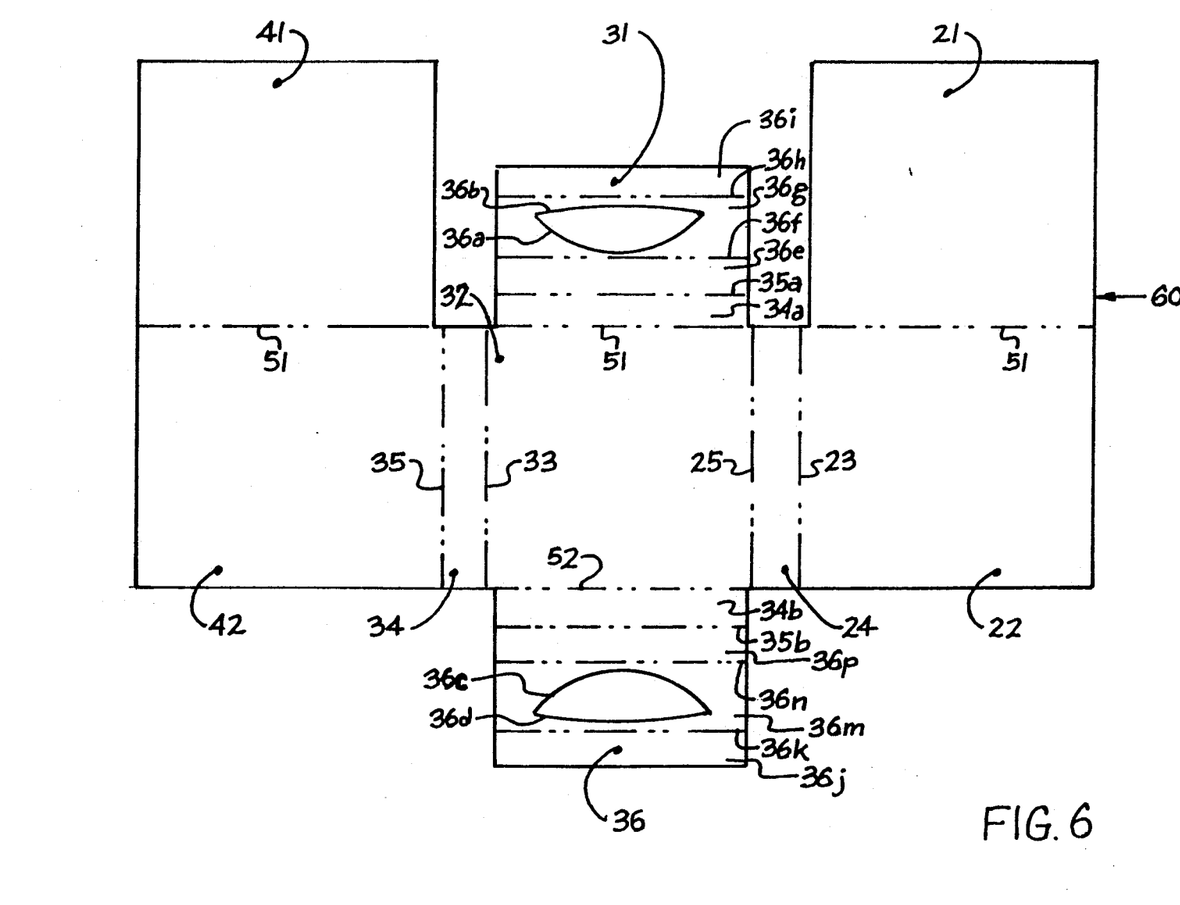
FIG. 6 is an unassembled plan view drawing showing an unfolded blank from which a second embodiment of the compact disc container may be constructed.

Referring to FIG. 6, Blank 60 in its unconstructed stage comprises a rectangular sheet having white, printable surfaces which is divided into seven major Sections: 21, 22, 31, 32, 36, 41 and 42. Sections 21 and 22, Sections 31 and 32 and Sections 41 and 42 are bounded by Fold Line 51. Sections 32 and 36 are bounded by Fold Line 52. Section 31 and Section 36 each contain one elliptical diecut cutout. These two elliptical diecut cutouts are formed by Arcs 36a, 36b, 36c and 36d. The elliptical diecut cutouts are within Surface 36g, which is bounded by Fold Lines 36f and 36h, and Surface 36m, which is bounded by Fold Lines 36k and 36n.

Figure 7:
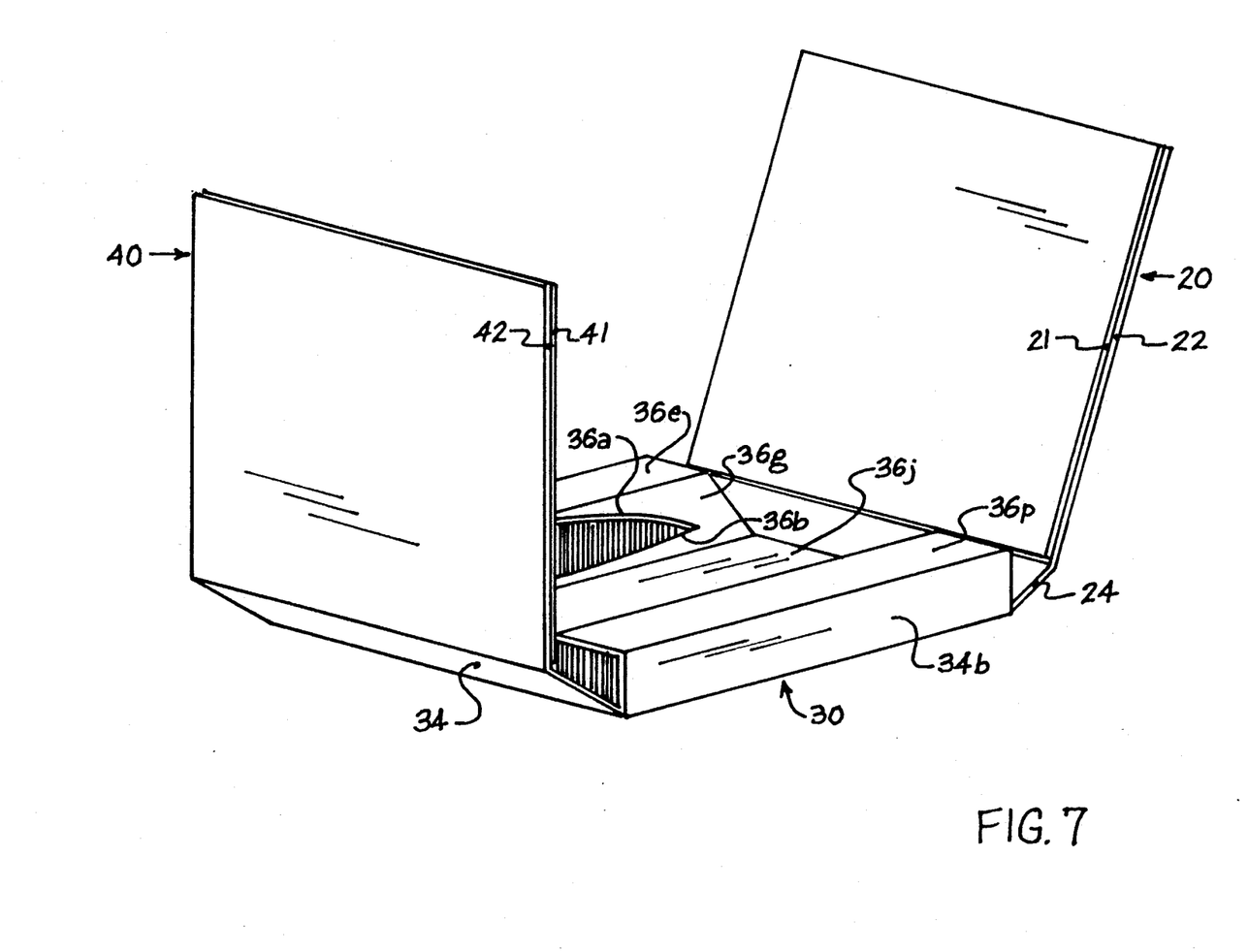
FIG. 7 is a perspective view of the invention constructed from the unfolded blank shown in FIG. 6 which includes a Disc Holder Panel, a Cover Panel, and a second or Outside Cover Panel.

During construction of the Container into the form shown in FIG. 7, these steps are followed:

Section 21 is folded over on Fold Line 51 on top of Section 22 and then glued down to form resultant Cover Panel 20. Section 41 is folded over on Fold Line 51 on top of Section 42 and then glued down to form resultant Outside Cover Panel 40.

Further in construction, thin Section 34a is folded up at Fold Line 51 and Section 31 is folded over at Fold Line 35a, enabling Surface 36i, when folded over at Fold Line 36h to be placed on top of the center of Section 32 and then glued down. Surface 36e, that is bounded by Fold Lines 35a and 36f should be wide enough to provide an adequately sloped Surface 36g when Surface 36i is glued down in the center of Surface 32.

Thin Section 34b is folded up at Fold Line 52 and Section 36 is folded over at Fold Line 35b, enabling Surface 36j, when folded over at Fold Line 36k to be placed on top of Surface 36i and then glued down. Section 34b must be narrower than Surface 34a by the thickness of Surface 36i in order to provide a clean appearance and structural integrity by matching the slope of Surface 36m to the slope of Surface 36g when Surface 36j is glued down.

Surface 36p must be wide enough to provide an adequately sloped surface 36m when Surface 36j is glued down to Surface 36i. As shown in FIG. 7, together Sections 31, 32 and 36 form Disc Holder Panel 30. To complete the construction, a Compact Disc is placed between Arcs 36a and 36d. Section 24 is folded up at Fold Line 25 and Cover Panel 20 is folded over at Fold Line 23 to cover the Disc Holder Panel 30. Section 34 is folded up at Fold Line 33 and Outside Cover Panel 40 is folded over at Fold Line 35 to cover the other Cover Panel 20, completing construction of the Container. Section 34 must be wider than Section 24 by slightly more than the thickness of Cover Panel 20 to provide a clean appearance and structural integrity when the Container is closed.

While the preferred and a second embodiment of the Invention have been shown and described, it will be apparent to those skilled in the art that various modifications and changes and rearrangements are possible. The foregoing description in no way limits the invention, whose scope is defined only by the appended claims.

What is claimed is:

1. A container for holding, displaying and storing a compact disc which comprises:
 a sheet scored, folded and glued to form panels;
 a Disc Holder Panel having the means of holding a disc by pinching at four points of its outer periphery;
 a Cover Panel which is hingeably attached to the Disc Holder Panel to permit folding of the panels on themselves.

2. The container of claim 1, wherein the sheet comprises recycled paperboard.

3. The container of claim 1 wherein the Disc Holder Panel comprises a structure having two elliptical diecut cutouts, one cutout in each of two sloped surfaces.

4. The container of claim 1, wherein the sheet is preprinted on available surfaces.

5. A container for holding, displaying and storing a compact disc which comprises:
  a sheet scored and folded to form panels;
  a Disc Holder Panel having the means of holding a disc by pinching at four points of its outer periphery;
  two Cover Panels which are hingeably attached to the Disc Holder Panel to permit folding of the panels on themselves.

6. The container of claim 5, wherein the sheet comprises recycled paperboard.

7. The container of claim 5 wherein the Disc Holder Panel comprises a structure having two elliptical diecut cutouts, one cutout in each of two sloped surfaces.

8. The container of claim 5, wherein the sheet is preprinted on available surfaces.

9. A container for holding, holding, displaying and storing a compact disc which comprises:
  a sheet divided into two rows of rectangular sections, the rows being separated by a fold line;
  the upper two rectangular sections being separated from each other by a gutter of space slightly wider than the width of the thin section below it on the sheet which separates the two rectangular sections on the right end of the lower row of rectangular sections, the upper two rectangular sections being folded down on the fold line which separates the two rows of rectangular sections and glued to form a cover panel on the right of the two rows of rectangular sections and the outside of a disc holder panel in the center of the two rows of rectangular sections, the thin section between the two rectangular sections on the right end of the lower row of rectangular sections forming a spine between the cover panel and the disc holder panel when the cover panel and the disc holder panel are folded against each other on the two fold lines which bound the thin section between the two rectangular sections on the right end of the lower row of rectangular sections;
  the section at the left end of the lower row of rectangular sections being separated from the outside of the disc holder panel by a thin section which is thinner than a CD jewel-box by the thickness of the cover panel and the disc holder panel, forming the inside surfaces of the disc holder panel when folded over on the two fold lines that bound the thin section that separates the section at the left end of the lower row of rectangular sections from the outside of the disc holder panel;
  the surfaces of the section at the left end of the lower row of rectangular sections forming the inside surfaces of the disc holder panel consisting of two top surfaces, the planes of which are parallel to the plane of the outside of the disc holder panel and two sloping surfaces having the means of holding a disc by pinching in at four points on the outer periphery of the disc when the center surface of the section at the left end of the lower row of rectangular sections is glued down to the outside of the disc holder panel.

10. The container of claim 9, wherein the sheet comprises recycled paperboard of 0.020" to 0.024" thickness.

11. The container of claim 9 wherein the two sloping surfaces of the disc holder panel comprise surfaces having an elliptical diecut cutout in each surface parallel to the length of the surfaces, the larger of the two arcs of each ellipse being located at the top of the sloping surface and being of sufficient height to enable the disc to easily pass through the ellipse at the top of the larger arc, while the descending portion of the same larger arc decreases in size enough as it descends on the sloping surface to pinch in on the outer periphery of the disc at the points approximately halfway down the sloping surface.

12. The container of claim 9, wherein the sheet is preprinted on available surfaces.

13. A container for holding, displaying and storing a compact disc which comprises:
  a sheet divided into three rows of rectangular sections, the rows being separated by fold lines with the third, or bottom row consisting of single rectangular section which is centered, left to right, below the other two rows;
  the upper three rectangular sections being separated from each other by two gutters of space slightly wider than the width of the thin sections below them on the sheet which separate the three rectangular sections in the middle row of rectangular sections, the outer two of the upper rectangular sections being folded down on the fold line which separates the upper and middle rows of rectangular sections and glued to form a cover panel and an outer cover panel, the two thin sections between the three rectangular sections in the middle row of rectangular sections forming two spines, one between the cover panel and the middle section in the middle row of rectangular sections and one between the outer cover panel and the middle section in the middle row of rectangular sections when the cover panel and outer cover panel are folded against each other on the fold lines which bound the two thin sections between the between the three rectangular sections in the middle row of rectangular sections;
  the section in the middle of the upper row of rectangular sections being separated from the middle section in the middle row of rectangular sections by a thin section which is thinner than the thickness of a CD jewel-box by the thickness of the cover panel, the thickness of the outer cover panel and the thickness of the middle section in the middle row of rectangular sections, forming the inside surfaces of the top half of the disc holder panel when folded over on the two fold lines that bound the thin section that separates the section in the middle of the upper row of rectangular sections from the middle section in the middle row of rectangular sections;
  the surfaces of the section in the middle of the upper row of rectangular sections forming the inside surfaces of the top half of the disc holder panel consisting of a top surface, the plane of which is parallel to the plane of the section in the middle of the middle row of rectangular sections and a sloping surface having the means of holding a disc by pinching in at two points on the outer periphery of the disc when the outside surface of the section in the middle of the upper row of rectangular sections is glued down to the middle section in the middle row of rectangular sections;
  the section in the bottom row being separated from the middle section in the middle row of rectangular sections by a thin section which is thinner than the thickness of a CD jewel-box by the thickness of the cover panel, the thickness of the outer cover panel and the thickness of the middle section in the middle row of rectangular sections forming the inside surfaces of the bottom half of the disc holder panel when folded over on the two fold lines that bound the thin section that separates the section in the bottom row from the middle section in the middle row of rectangular sections;

the surfaces of the section in the bottom row forming the inside surfaces of the bottom half of the disc holder panel consisting of a top surface, the plane of which is parallel to the plane of the section in the middle of the middle row of rectangular sections and a sloping surface having the means of holding a disc by pinching in at two points on the outer periphery of the disc when the outside surface of the section in the bottom row of rectangular sections is glued down to the middle section in the middle row of rectangular sections.

14. The container of claim 13, wherein the sheet comprises recycled paperboard of 0.02" to 0.024" thickness.

15. The container of claim 13 wherein the two sloping surfaces of the disc holder panel comprise surfaces having an elliptical diecut cutout in each surface parallel to the length of the surface, the larger of the two arcs of each ellipse being located at the top of the sloping surface and being of sufficient height to enable the disc to easily pass through the ellipse at the top of the larger arc, while the descending portion of the same larger arc decreases in size enough as it descends on the sloping surface to pinch in on the outer periphery of the disc at a point approximately halfway down the sloping surface.

16. The container of claim 13, wherein the sheet is preprinted on available surfaces.

* * * * *